(12) United States Patent
Tian

(10) Patent No.: US 6,283,441 B1
(45) Date of Patent: Sep. 4, 2001

(54) PILOT ACTUATOR AND SPOOL VALVE ASSEMBLY

(75) Inventor: Steven Y. Tian, Bloomington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/501,751

(22) Filed: Feb. 10, 2000

(51) Int. Cl.⁷ .......................... F16K 31/12; F02M 47/02; F02M 45/10
(52) U.S. Cl. .......................... 251/30.03; 239/91; 239/93; 239/95; 239/96
(58) Field of Search .............................. 251/30.03, 30.01, 251/30.02; 239/88, 91, 92, 93, 95, 96

(56) References Cited

U.S. PATENT DOCUMENTS

| | | |
|---|---|---|
| 1,707,541 | 4/1929 | Roth . |
| 2,479,359 | 8/1949 | Holt . |
| 2,622,618 | 12/1952 | Ghormley . |
| 2,629,401 | 2/1953 | Miller . |
| 2,799,466 | 7/1957 | Hickerson . |
| 2,977,984 | 4/1961 | Barnes . |
| 3,312,445 | 4/1967 | Trombatore et al. . |
| 3,351,316 | 11/1967 | Lewis et al. . |
| 3,405,906 | 10/1968 | Keller . |
| 3,529,628 | 9/1970 | Cummins . |
| 3,802,626 * | 4/1974 | Regneault et al. ..................... 239/96 |
| 4,155,535 | 5/1979 | Seamone . |
| 4,544,096 | 10/1985 | Burnett . |
| 4,585,030 | 4/1986 | Fox . |
| 4,618,095 * | 10/1986 | Spoolstra .............................. 239/90 |
| 4,746,093 | 5/1988 | Scanderbeg . |
| 4,779,837 | 10/1988 | Mito et al. . |
| 4,938,450 | 7/1990 | Tripp et al. . |
| 5,113,908 | 5/1992 | Steinke . |
| 5,323,964 | 6/1994 | Doszpoly et al. . |
| 5,332,003 | 7/1994 | Nikolayczik . |
| 5,339,777 | 8/1994 | Cannon . |
| 5,669,355 | 9/1997 | Gibson et al. . |
| 5,682,858 | 11/1997 | Chen et al. . |
| 5,685,483 | 11/1997 | Ganser . |
| 5,687,693 | 11/1997 | Chen et al. . |
| 5,697,342 | 12/1997 | Anderson et al. . |
| 5,720,318 | 2/1998 | Nagarajan et al. . |
| 5,738,075 | 4/1998 | Chen et al. . |
| 5,803,119 | 9/1998 | Steinke . |
| 5,803,429 | 9/1998 | Tsuzuki et al. . |
| 5,826,562 | 10/1998 | Chen et al. . |
| 5,833,146 | 11/1998 | Hefler . |
| 5,893,350 * | 4/1999 | Timms ................................. 123/467 |
| 5,975,139 | 11/1999 | Carroll et al. . |
| 6,119,960 * | 9/2000 | Graves ................................. 239/92 |

FOREIGN PATENT DOCUMENTS

| | | |
|---|---|---|
| 26 02 844 A1 | 8/1977 | (DE) . |
| 1 328 959 | 9/1973 | (IT) . |

\* cited by examiner

*Primary Examiner*—Kevin Shaver
*Assistant Examiner*—D. Austin Bonderer
(74) *Attorney, Agent, or Firm*—Liell & McNeil

(57) ABSTRACT

A pilot actuated spool valve assembly includes a valve body that defines a first passage, a second passage and a flow passage. A unitary pilot body is at least partially positioned in the valve body and has a first valve seat and a second valve seat. A pilot member is moveable in the pilot body between an up position in which the pilot member closes the first valve seat and a down position in which the pilot member closes the second valve seat. A spool valve member has a control hydraulic surface and is positioned in the valve body. It is moveable between a first position in which the first passage is open to the flow passage, and a second position in which the second passage is open to the flow passage. At least one of the valve body, the pilot body, the pilot member and the spool valve member define a control volume fluidly connected to the first passage when the pilot member is in one of its up position and its down position. The control hydraulic surface of the spool valve member is exposed to fluid pressure in the control volume. The valve assembly finds its preferred application in a hydraulically actuated fuel injector having a direct control needle valve.

15 Claims, 2 Drawing Sheets

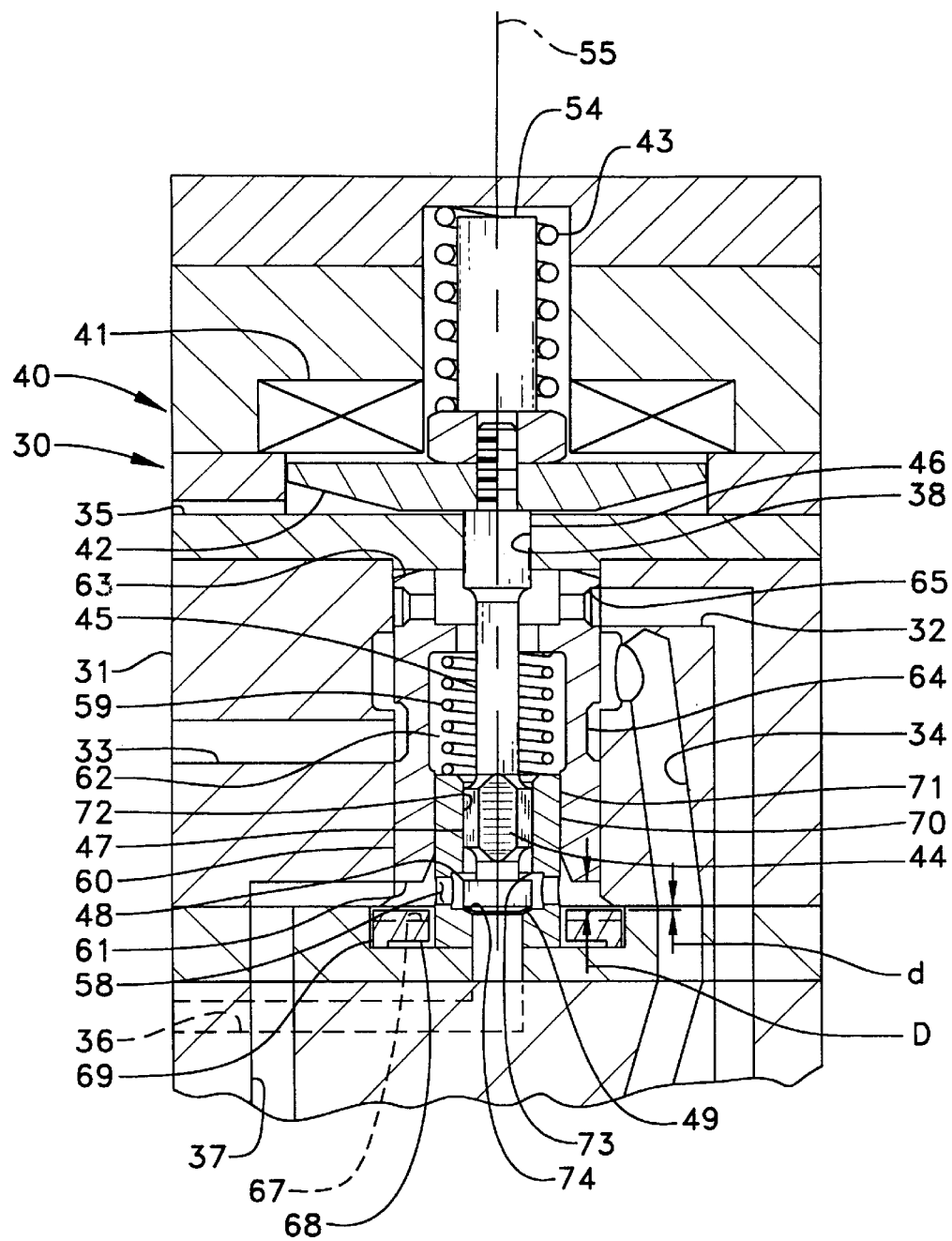
Fig_2

PILOT ACTUATOR AND SPOOL VALVE ASSEMBLY

TECHNICAL FIELD

The present invention relates generally to control valves, and more particularly to pilot actuated spool valve assemblies.

BACKGROUND ART

In many hydraulically actuated devices, such as hydraulically actuated fuel injectors, a three way valve assembly controls the operation of the device. In general, the valve assembly opens an internal work flow passage to a high pressure passage when the device is operating, such as to hydraulically move a piston. Between operation events, the work flow passage is opened to a low pressure passage or drain so that the used fluid in the flow passage can be removed, and the device reset for its next operation event. In the case of a hydraulically actuated fuel injector, high pressure fluid acts on a pumping element to pressurize fuel during an injection event, and the pumping element retracts and resets between injection events. In some cases, the control valve assembly consists essentially of a poppet valve member that is moved between a pair of conical valve seats by a solenoid actuator.

Although the relatively simple solenoid actuated poppet valves have performed well for many years, engineers are always seeking ways to improve performance, increase reliability and reduce costs. In addition, there is often a trend to add additional functions to the control valve assembly to perform additional functions, such as controlling a direct control needle valve in a fuel injector. One response to these trends is to substitute a pilot actuated valve that utilizes a relatively small solenoid to move a small pilot member, which in turn controls the positioning of a relatively larger spool valve that opens and closes the high and low pressure passages. These pilot actuated valves can come in a variety of designs, including those in which the pilot member is a ball, or is a relatively small poppet valve member that moves between conical valve seats. While these newer pilot valve assemblies have performed well, there still remains room for improvement in areas such as reducing part count, improving concentric alignment between valve components, integrating the valve assembly in a relatively small package, and improving the ability of the valve assembly to simultaneously control two or more functions, such as fuel pressurization and injection timing.

The present invention is directed to improving upon these and other aspects of pilot actuated valve assemblies, especially as they relate to fuel injectors.

DISCLOSURE OF THE INVENTION

A pilot actuated spool valve assembly includes a valve body the defines a first passage, a second passage and a flow passage. A unitary pilot body is at least partially positioned in the valve body and has a first valve seat and a second valve seat. A pilot member is moveable in the pilot body between an up position in which the pilot member closes the first valve seat, and a down position in which the pilot member closes the second valve seat. A spool valve member has a control hydraulic surface and is positioned in the valve body. It is moveable between a first position in which the first passage is open to the flow passage, and a second position in which the second passage is open to the flow passage. At least one of the valve body, the pilot body, the pilot member and the spool valve member define a control volume fluidly connected to the first passage when the pilot member is in one of its up position and down position. The control hydraulic surface of the spool valve member is exposed to fluid pressure in the control volume.

BRIEF DESCRIPTION OF THE DRAWINGS

FIG. 2 is a sectioned side diagrammatic view of the pilot actuated spool valve assembly portion of the fuel injector shown in FIG. 1.

BEST MODE OF CARRYING OUT THE INVENTION

Figure 1:
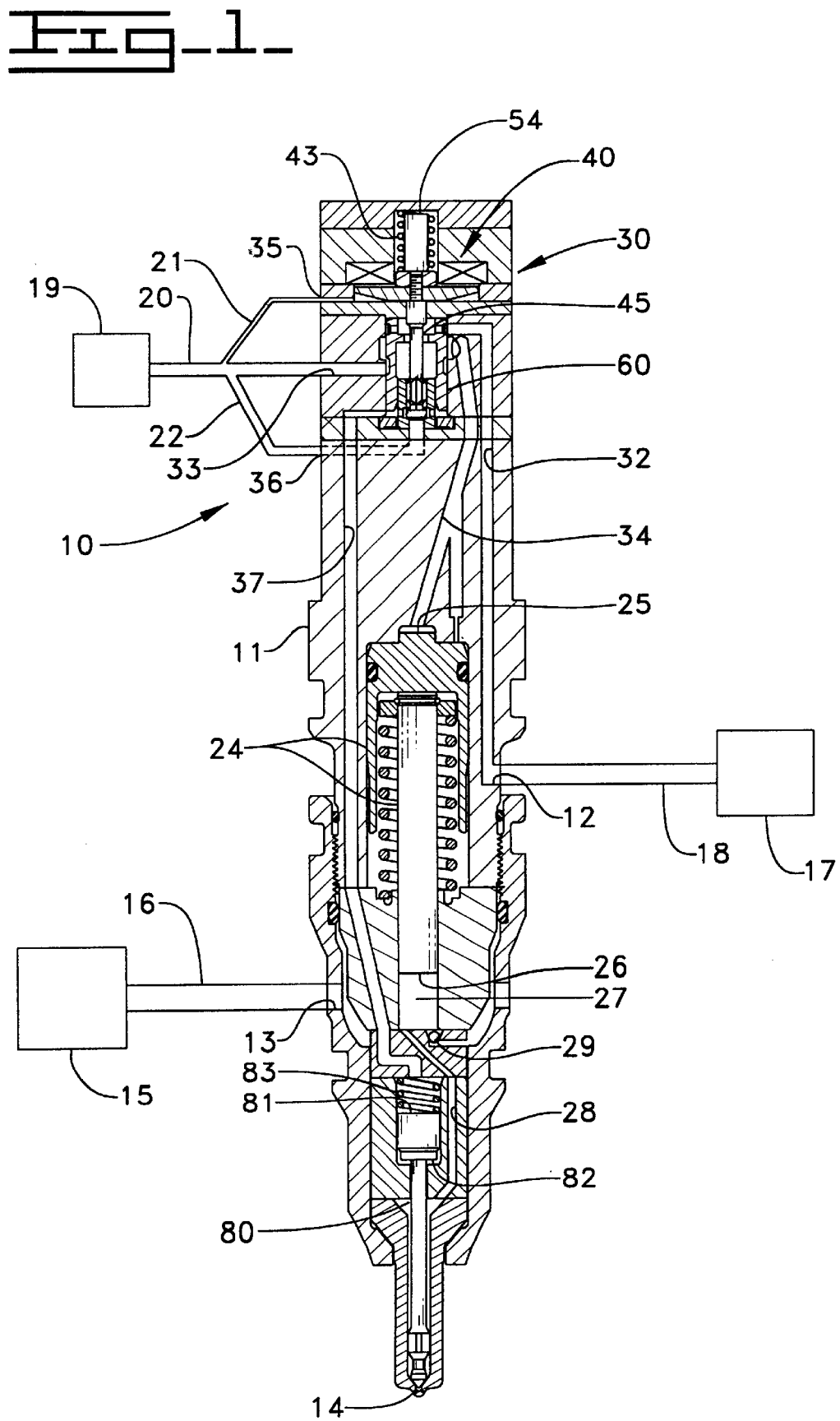
FIG. 1 is a sectioned side diagrammatic view of a hydraulically actuated fuel injector according to the present invention.

Referring now to FIGS. 1 and 2, a hydraulically actuated fuel injector 10 includes an injector body 11 made up of various components attached to one another in a manner well known in the art. Injector body 11 defines an actuation fluid inlet 12 connected to a source of high pressure actuation fluid 17 via a high pressure supply line 18, and a fuel inlet 13 connected to a source of fuel 15 via a fuel supply line 16. Injector body 11 also defines a low pressure passage 33 connected to a low pressure actuation fluid reservoir 19 via an actuation fluid drain 20. In addition, injector body 11 defines an armature cavity vent 35 and a low pressure vent 36 that are connected to actuation fluid drain 20 via a pair of low pressure vent passages 21 and 22, respectively. Finally, injector body 11 defines a nozzle outlet 14 that is preferably positioned in a combustion space of an internal combustion engine. In the preferred embodiment, the source of high pressure actuation fluid is a common rail containing pressurized lubricating oil, the low pressure actuation fluid reservoir is the engine oil lubricating oil sump, and the source of fuel 15 is a fuel tank containing relatively low pressure distillate diesel fuel. Fuel injector 10 is controlled in its operation via a valve assembly 30 that is actuated by a single electrical actuator 40, which is preferably a solenoid but could be any other suitable electrical actuator, such as a piezzo electric actuator.

A portion of injector body 11 is a valve body 31 that defines a high pressure passage 32 that is connected to actuation fluid inlet 12, a low pressure passage 33 that is connected to actuation fluid drain 20, and an actuation fluid flow passage 34. A pumping element 24 includes a relatively large hydraulic surface 25 that is exposed to fluid pressure in actuation fluid flow passage 34, and a relatively small hydraulic surface 26 exposed to fuel pressure in a fuel pressurization chamber 27. Those skilled in the art will appreciate that pumping element 24 serves as the means by which fuel is pressurized to relatively high injection pressure due to the hydraulic force applied to the large hydraulic surface 25 via the actuation fluid during an injection event. Between injection events, valve assembly 30 fluidly connects actuation fluid flow passage 34 to the low pressure passage 33. During that injection event, actuation fluid flow passage 34 is connected via valve assembly 32 to high pressure passage 32. During an injection event, fuel pressurized in fuel pressurization chamber 27 travels down a nozzle supply passage 28 past a direct control needle valve 80 and out of the injector through nozzle outlet 14. Between injection events, when pumping element 24 is under going its upward retracting stroke, fresh fuel is drawn into fuel pressurization chamber 27 past a check valve 29.

The direct control needle valve 80 includes a closing hydraulic surface 81 that is exposed to fluid pressure in a control pressure passage 37, and a lifting hydraulic surface 82 that is exposed to fuel pressure in nozzle supply passage 28. In addition, direct control needle valve 80 is normally biased downward toward its closed position that closes nozzle outlet 14 by a biasing spring 83. The various hydraulic surfaces and spring strength as well as the designed actuation fluid pressures and fuel injection pressures are such that direct control needle valve 80 will only open to permit fuel injection when pressure on closing hydraulic surface 81 is relatively low and fuel pressure is above a valve opening pressure sufficient to overcome biasing spring 83. When actuation fluid pressure acting upon closing hydraulic surface 81 is relatively high, direct control needle valve 80 will either remain in or move toward its downward closed position, even when fuel pressures are at relatively high injection levels. Valve assembly 30 controls the fluid connection control pressure passage 37 to either high pressure inlet 12 or low pressure drain 20. Recalling, closing hydraulic surface 81 is exposed to fluid pressure in control pressure passage 37. Thus, valve assembly 30 controls the timing at which fuel is pressurized within the fuel injector (flow passage 34), and also controls the timing at which the fuel injection starts and ends via pressure in control pressure passage 37 that acts on direct control needle valve 80.

Referring now more specifically to FIG. 2, the control valve assembly 30 of the fuel injector shown in FIG. 1 includes a valve body 31 made of one or more components attached to one another in a manner well known in the art. The electrical actuator (solenoid) 40 is attached to valve body 31 and includes a stationary coil 41 and a moveable armature 42. Armature 42 is attached to a pilot member 45, and both are biased downward by an armature spring 43. One end of pilot member 45 is a valve surface 49 that contacts and closes a lower conical valve seat 74 when armature 42 and pilot member 45 are in their downward position. When solenoid 40 is energized, armature 42 and pilot member 45 are lifted upward to a position in which annular edge 48 closes upper valve seat 73. Pilot member 45 is limited in its upward travel by a pin stop 54 which comes in contact with the underside of the solenoid cover when the armature and pilot member are in their upward position. When in this upward position, upper valve seat 73 is closed but lower valve seat 74 is open such that control pressure passage 37 is exposed to low pressure vent 36. Pilot member 45 includes an upper guide portion 46 that is slideably guided in a guide bore 38, and a lower guide portion 47 that is slideably guided in a lower guide bore 72. In order to facilitate fluid communication between the area above and below lower guide portion 47, pilot member 45 has a plurality flats machined thereon. However, those skilled in the art will appreciate that other fluid communication strategies, such as an internal passage could be substituted for the flats illustrated in the preferred embodiment.

The positioning of pilot member 45 not only controls oil pressure in control pressure passage 37, which controls the direct control needle valve 80, it also influences the positioning of a spool valve member 60, which opens and closes flow passage 34 to high pressure passage 32. Spool valve member 60 is normally biased to an upward position by a biasing spring 59 that is compressed between spool valve member 60 and a pilot body 70. When in this upward position as shown, flow passage 34 is open to low pressure passage 33 past an annulus 64 machined on the outer surface of spool valve member 60. When spool valve member 60 moves toward its downward position in contact with a spool lifter 69, annulus 64 moves out of fluid communication with flow passage 34 at about the same time as a plurality radial passages 65 connect high pressure passage 32 to flow passage 34. Radial passages 65 maintain the hollow interior 62 of spool valve member 60 in continuous fluid communication with high pressure passage 32. Spool valve member 60 is moved between its respective positions under the action of biasing spring 59 and the respective hydraulic forces acting on control hydraulic surface 61 and opposing hydraulic surface 63. The opposing hydraulic surface 63 is preferably always exposed to the high fluid pressure existing within hollow interior 62, and the control hydraulic surface is preferably exposed to a control volume 58, that is a beginning portion of control pressure passage 37, which extends from the area between seats 73 and 74 all the way to the closing hydraulic surface 81 of direct control needle valve 80. In this preferred example, control volume 58 is defined by portions of pilot member 45, pilot body 70, spool lifter 69, valve body 31 and control hydraulic surface 61 of spool valve member 60. Control hydraulic surface 61 and opposing hydraulic surface 63 preferably have about equal effective areas such that spool valve member 60 will stay at or move toward its upward position, as shown, when upper valve seat 73 is open such that high pressure prevails in control volume 58. These hydraulic surfaces and are sized and the strength of spring 59 is chosen such that spool valve member 60 will move toward, or stay at, its downward position when upper valve seat 73 is closed to fluidly connect control volume 58 to low pressure vent 36. When spool valve member 60 is in its downward position, a groove 67 machined in spool lifter 69 maintains fluid communication between control pressure passage 37 and the area between valve seat 73 and 74.

In part to decrease part count and maintain a compact design, pilot member 45, pilot body 70 and spool valve member 60 preferably share a common center line 55. Pilot member 45 moves within pilot body 70, which is maintained stationary by the continuous downward force provided by spring 59. Pilot body 50 has an outer cylindrical surface 71, an inner guide bore 72, an upper valve seat edge valve seat 73 and a lower conical valve seat 74 that are preferably machined in a single chucking to maintain concentricity among these surface features. In addition, by making upper valve seat 73 an edge seat, pilot body 70 can be machined from a single unitary piece of metal instead of two or more joined components as would be required by opposing conical seats. Spool valve member 60 slides on the outer surface 71 of pilot body 70. In the preferred embodiment, the lower guide portion 47 of pilot member 45 is preferably slightly larger in diameter than the upper guide portion 46 so that the same is at least slightly hydraulically imbalanced toward a downward position.

When spool valve member 60 is in its downward position, a substantial portion of control hydraulic surface 61 comes into contact with the upper surface of spool lifter 69, which tends to isolate a portion of control hydraulic surface 61 from the fluid pressure existing in control volume 58. This isolation of a portion of control hydraulic surface 61 can cause hesitation in the upward movement of spool valve member 60 when high pressure is resumed in control volume 58. In order to inhibit this hesitation, spool lifter 69 is machined to have a height that will allow it to move upward a relatively small distance "d", and includes a lifting hydraulic surface 68 that has a larger effective area than opposing hydraulic surface 63 of spool valve member 60. The movement distance "d" of spool lifter 69 is substantially smaller than the travel distance "D" of spool valve member 60. When spool valve member is in its downward position and high pressure resumes in control volume 58, the upward force acting on spool lifting hydraulic surface 68 of spool lifter 69 causes it and spool valve member 60 to begin upward movement. This upward movement along with the momentum created thereby causes spool valve member to break free of spool lifter 69 when it has traveled its upward distance "d", which causes the high pressure then existing in control volume 58 to act on the complete control hydraulic surface 61 and continue the upward movement of spool valve member 60 to its upward position as shown.

INDUSTRIAL APPLICABILITY

Immediately before the initiation of an injection event, solenoid 40 is de-energized, pilot member 45 is in its downward position closing valve seat 74, spool valve member 60 is in its upward position, pumping element 24 is in its upward retracted position, and direct control needle valve 80 is in its downward closed position. At this time, flow passage 34 is open to low pressure passage 33, control pressure passage 37 is open to high pressure passage 32 via valve seat 73, hollow interior 62 and radial passages 65. At the same time, fuel pressure in the fuel injector 10 is relatively low. Each injection event is initiated by energizing solenoid 40 to lift pilot member 45 upward to close valve seat 73 and open lower valve seat 74. When this occurs, control volume 58 and pressure control passage 37 are vented to low pressure vent 36 past lower valve seat 74. This relieves pressure on closing hydraulic surface 81 of direct control needle valve 80 and the pressure on control hydraulic surface 61 of spool valve member 60. When this happens, direct control needle valve 80 remains in its downward position under the action of its biasing spring 83, but spool valve member 63 is now hydraulically imbalanced and begins its downward movement. This occurs because the fluid pressure force on opposing hydraulic surface 63 is now much greater than the combined low pressure force on control hydraulic surface 61 and the spring force provided by spring 59. As spool valve member 60 moves downward, it closes low pressure passage 33 and opens flow passage 34 to high pressure passage 32. When this occurs, high pressure actuation fluid flows into flow passage 34 and acts on hydraulic surface 25 causing pumping element 24 to begin its downward stroke to raise fuel pressure in fuel pressurization chamber 27 to injection levels.

When fuel pressure in fuel pressurization chamber 27 exceeds a valve opening pressure sufficient to overcome spring 83, direct control needle valve 80 will lift and open nozzle outlet 14 to commence the spraying of fuel into the combustion space. If it is desired to raise the initial injection pressure above the normal valve opening pressure, the solenoid 40 can be briefly de-energized to open seat 73 and close seat valve seat 74. When this occurs, high pressure resumes in control pressure passage 37 and acts on closing hydraulic surface 81 of direct control needle valve 80 to hold the same closed. At the same time, high pressure resumes in control volume 58 causing spool valve member 60 to begin its upward movement under the action of spring 59. Preferably, the various hydraulic surfaces, spring strengths, solenoid speed, etc. are such that pilot member 45 can move to its upward position, stay at that location briefly and be moved back to its downward position before spool valve member can move far enough upward to close fluid communication between passage 34 and high pressure passage 32. As such, each beginning portion of an injection event can be controlled in its initial injection pressure and split injections can be performed in a manner more thoroughly discussed in relation to known direct control needle valves in numerous patents owned by Caterpillar, Inc. of Peoria, Ill..

During the main injection event, solenoid 40 remains energized and pilot member 45 remains in its upward position closing valve seat 73. Also during the main injection event, spool valve member 60 stays at or near its lower position, and maintains communication between high pressure passage 32 and flow passage 34. Shortly before the desired amount of fuel has been injected, solenoid 40 is de-energized. This allows pilot member 45 to move downward to reopen valve seat 73 and close valve seat 74. This resumes high pressure in control pressure passage 37 causing direct control needle valve 80 to move downward quickly to close nozzle outlet 14 and end the injection event. At the same time, spool valve member 60 begins to move upward under the action of spool lifter 69 and biasing spring 59. As spool valve member 60 continues its upward movement it breaks free of its contact with spool lifter 69 and eventually moves to an intermediate position in which flow passage 34 closes to high pressure passage 32 but reopens to low pressure passage 33 via annulus 64. When this occurs, the actuation fluid pressure acting on hydraulic surface 25 of pumping element 24 is relieved. Pumping element 24 then retracts under the action of its biasing spring to move the used actuation fluid into low pressure passage 33 and toward drain 20 for eventual recirculation. At the same time, fresh low pressure fuel is drawn into fuel pressurization chamber 27 past check valve 29. This complete process repeats itself for each injection cycle.

It should be understood that the above description is intended for illustrative purposes only, and is not intended to limit the scope of the present invention in any way. For instance, the valve assembly of the present invention has been shown as preferably exposing one end of the spool valve member at all times to high pressure fluid, but those skilled in the art will appreciate that the valve assembly could be made to work by always exposing one end of the spool valve member to low pressure and making appropriate adjustments to spring strengths and plumbing. Furthermore, the spool valve member and/or the pilot member could be machined to include hydraulic imbalances that could alter the performance of the valve assembly to suite some particular objective. Finally, the various surfaces, spring strengths, solenoid speeds, etc. have been shown as preferably allowing the pilot member to quickly move between its upward and downward positions substantially faster than the spool valve member can move from its downward to its upward position in order to control movement of the direct control needle valve during the beginning portion and end of an injection event. Those skilled in the art will appreciate that other adjustments in spring strengths, solenoid speeds, mass properties, etc. could be made in order to achieve other desired results than those described with regard to the preferred embodiment. Thus, those skilled in the art will appreciate the various modifications could be made to the disclosed embodiment without departing from the intended scope of the present invention, which is defined in terms of the claims set forth below.

What is claimed is:

1. A pilot actuated spool valve assembly comprising:

a valve body defining a first passage, a second passage and a flow passage;

a unitary pilot body at least partially positioned in said valve body and having a first valve seat and a second valve seat;

a pilot member moveable in said pilot body between an up position in which said pilot member closes said first valve seat, and a down position in which said pilot member closes said second valve seat;

a spool valve member having a control hydraulic surface and being positioned in said valve body and being moveable between a first position in which said first passage is open to said flow passage, and a second position in which said second passage is open to said flow passage;

at least one of said valve body, said pilot body, said pilot member and said spool valve member defining a control volume fluidly connected to said first passage when said pilot member is in one of said up position and said down position; and said control hydraulic surface being exposed to fluid pressure in said control volume.

2. The pilot actuated spool valve assembly of claim 1 wherein said spool valve member slides on an outer surface of said pilot body when moving between said first position and said second position.

3. The pilot actuated spool valve assembly of claim 1 further comprising an electrical actuator having a moveable portion attached to said pilot member.

4. The pilot actuated spool valve assembly of claim 1 further comprising a spring compressed between said pilot body and said spool valve member.

5. The pilot actuated spool valve assembly of claim 1 wherein said spool valve member includes an opposing hydraulic surface oriented in opposition to said control hydraulic surface and always being exposed to fluid pressure in one of said first passage and said second passage.

6. The pilot actuated spool valve assembly of claim 1 further comprising a spool lifter positioned in said valve body and being in contact with said spool valve member when said spool valve member is in said first position; and said spool lifter moving said spool valve member a lift distance that is a portion of a distance moved by said spool valve member between said first position and said second position.

7. The pilot actuated spool valve assembly of claim 1 wherein said spool valve member, said pilot member and said pilot body share a common centerline.

8. The pilot actuated spool valve assembly of claim 1 further comprising an electrical actuator having a moveable portion attached to said pilot member;

said spool valve member slides on an outer surface of said pilot body when moving between said first position and said second position;

said spool valve member, said pilot member and said pilot body share a common centerline; and said spool valve member includes an opposing hydraulic surface oriented in opposition to said control hydraulic surface and always being exposed to fluid pressure in one of said first passage and said second passage.

9. A hydraulic actuator comprising:

a valve body defining a high pressure passage; a low pressure passage and a flow passage;

a source of high pressure fluid connected to said high pressure passage;

a low pressure reservoir connected to said low pressure passage;

an electrical actuator attached to said valve body and having a moveable portion;

a pilot member attached to said moveable portion of said electrical actuator, and being moveable between an up position and a down position;

a spool valve member being positioned in said valve body at least partially surrounding said pilot member and being moveable between a first position in which said high pressure passage is open to said flow passage, and a second position in which said low pressure passage is open to said flow passage, and said spool valve member having a control hydraulic surface exposed to fluid pressure in said high pressure passage when said pilot member is in one of said up position and said down position.

10. The hydraulic actuator of claim 9 further comprising a unitary pilot body at least partially positioned in said valve body and having a first valve seat and a second valve seat;

said pilot member moving in said pilot body and closing said first valve seat when in said up position and closing said second valve seat when in said down position.

11. The hydraulic actuator of claim 10 further comprising a spring compressed between said pilot body and said spool valve member.

12. The hydraulic actuator of claim 11 wherein said spool valve member includes an opposing hydraulic surface oriented in opposition to said control hydraulic surface and always being exposed to fluid pressure in one of said high pressure passage and said low pressure passage.

13. The hydraulic actuator of claim 12 wherein said spool valve member slides on an outer surface of said pilot body when moving between said first position and said second position.

14. The hydraulic actuator of claim 13 further comprising a spool lifter positioned in said valve body and being in contact with said spool valve member when said spool valve member is in said first position; and said spool lifter being capable of moving said spool valve member a lift distance that is a portion of a distance moved by said spool valve member between said first position and said second position.

15. The hydraulic actuator of claim 14 wherein said valve body defines a low pressure vent; and said control hydraulic surface is exposed to fluid pressure in said low pressure vent when said pilot member is in an other of said up position and said down position.

* * * * *